United States Patent [19]
Schroeder et al.

[11] Patent Number: 5,714,883
[45] Date of Patent: Feb. 3, 1998

[54] ROTATIONAL SENSOR INCLUDING AXIALLY ADJACENT TARGETS ONE OF WHICH HAVING INVARIANT PERMEABILITY THE OTHER HAVING VARYING PERMEABILITY AS THEY ROTATE

[75] Inventors: Thaddeus Schroeder, Rochester Hills; Bruno Patrice Bernard Lequesne, Troy, both of Mich.

[73] Assignee: General Motors Corporation, Detroit, Mich.

[21] Appl. No.: 580,037

[22] Filed: Dec. 20, 1995

[51] Int. Cl.⁶ ........................................... G01B 7/14
[52] U.S. Cl. ............................................ 324/207.22
[58] Field of Search ......................... 324/207.25, 207.12, 324/207.2, 207.21, 207.24, 207.22, 174, 173

[56] References Cited

U.S. PATENT DOCUMENTS

| | | | |
|---|---|---|---|
| 4,785,242 | 11/1988 | Vaidya et al. | 324/207.25 X |
| 4,881,414 | 11/1989 | Setaka et al. | 324/207.25 X |
| 4,926,122 | 5/1990 | Schroeder et al. | 324/207.13 |
| 5,315,244 | 5/1994 | Griebeler | 324/207.21 |
| 5,444,370 | 8/1995 | Wu | 324/207.2 |
| 5,469,055 | 11/1995 | Mueller et al. | 324/207.21 |

FOREIGN PATENT DOCUMENTS

| | | |
|---|---|---|
| 0569613 | 11/1993 | European Pat. Off. . |
| 0580207 | 1/1994 | European Pat. Off. . |
| 3339162 | 5/1985 | Germany . |
| WO94/20820 | 9/1994 | WIPO . |

Primary Examiner—Sandra L. O'Shea
Assistant Examiner—Roger Phillips
Attorney, Agent, or Firm—Vincent A. Cichosz

[57] ABSTRACT

A rotation sensor has a target wheel including first and second tracks and a dual-element magnetoresistive sensor. Each individual magnetoresistive element is aligned with a respective track of the target wheel to provide substantially inverse resistive changes with the passage of the wheel. One of the tracks is characterized by alternating high and low permeability, such as by a toothed section, and the other of the tracks is characterized by invariant permeability.

7 Claims, 4 Drawing Sheets

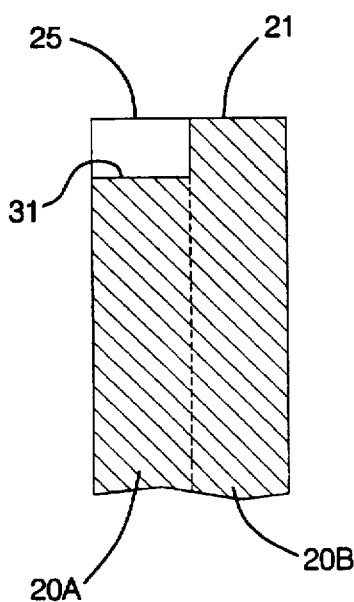
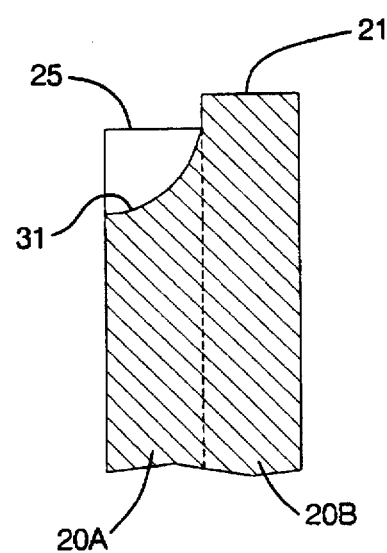
FIG. 7  FIG. 8
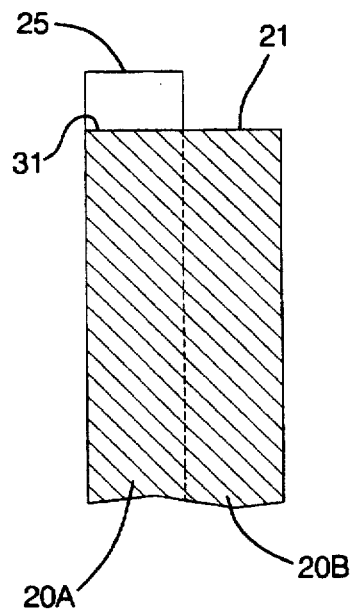
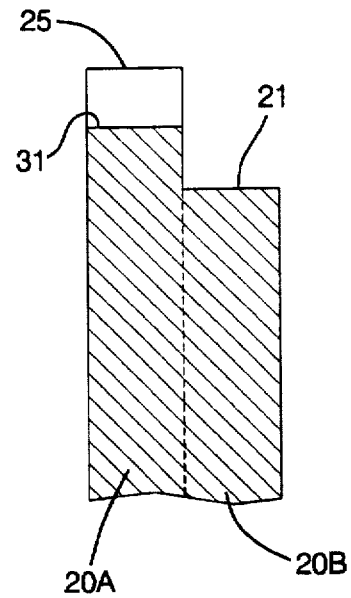
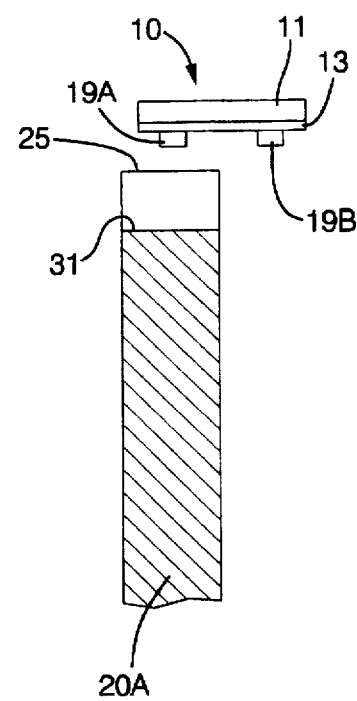
FIG. 9  FIG. 10  FIG. 11

1

ROTATIONAL SENSOR INCLUDING AXIALLY ADJACENT TARGETS ONE OF WHICH HAVING INVARIANT PERMEABILITY THE OTHER HAVING VARYING PERMEABILITY AS THEY ROTATE

BACKGROUND

The present invention is related to rotation sensing apparatus. More particularly, the invention is directed toward a high accuracy, dual-track target wheel rotational sensor.

High accuracy rotational sensors are known which utilize dual-track target wheels and a dual element galvanomagnetic sensing arrangement. Each section of such a target wheel is axially adjacent the other along the rotational axis thereof, and each section has disposed radially adjacent thereto one of the two elements. Such target wheel arrangements are particularly advantageous when employed, for example, as part of a rotating member such as an internal combustion engine crankshaft for determining rotational and positional information therefor. A known target wheel for such a sensor arrangement includes substantially complementary geometries. That is to say, a tooth location on one section is adjacent a slot on the other section. Output signals from the two elements are complementary and provide for high accuracy tooth edge detection with relatively simple differential signal processing. An example of such a sensor apparatus may be found in United States patent application Ser. No. 08/262,097 assigned to the assignee of the present invention.

However, while the geometry of such target wheels is conceptually simplistic, its manufacturability may pose certain disadvantages. For example, in the application as an engine crankshaft target wheel, it is most desirable to integrally cast the target wheel with tho crankshaft. Single track target wheels are cast in this manner and machined in final metal processing which includes through cutting of the target wheel teeth. Such simple metal cutting techniques are not compatible with the dual-track target wheel having the complementary tooth/slot arrangement, thereby necessitating costly specialized processes which unacceptably slow production. Dual-track target wheels may be manufactured separately from the rotating member such as by well known powder metal techniques either as a unitary structure or by joining each respective track portion to the other after formation. Either method is fraught with significant additional handling, tracking, assembly and, in the case of crankshaft applications, positioning considerations.

SUMMARY

Therefore, the present invention overcomes these shortcomings by providing a dual-track target wheel which is manufacturable as part of a unitary casting with the rotational member utilizing conventional machining techniques and equipment and without significant production throughput penalty.

In accordance with one aspect of the present invention, a target wheel is characterized by a first track which has alternating high and low permeability and a second track having invariant permeability at all angles of rotation.

In accordance with another aspect of the present invention, a ferromagnetic target wheel has a first section that is substantially disk-shaped having an outer surface that does not vary with the angular rotation thereof. Adjacent the first section is a second substantially disk-shaped section having a plurality of teeth at an outer periphery thereof.

In accordance with another aspect of the present invention, the outer surface of the first section is substantially intermediate the outer surfaces of the teeth and root surfaces between the teeth of the second section.

In accordance with yet another aspect of the present invention, a rotation sensor includes a target wheel having a first section that is substantially disk-shaped having an outer surface that does not vary with the angular rotation thereof and a second substantially disk-shaped section adjacent the first section having a plurality of teeth at an outer periphery thereof. The sensor further includes a dual element magnetoresistive sensor with an element operatively adjacent each one of the two sections such that rotation of the target wheel influences the flux density through each element and hence the resistance thereof. The resistance changes in the elements are detected to provide therefrom an output signal which is a function of the difference between the respective resistance values and hence indicate the rotational position of the target wheel.

BRIEF DESCRIPTION OF THE DRAWINGS

The present invention will now be described, by way of example, with reference to the accompanying drawings, in which:

FIGS. 7–10 generally illustrate sectional views of alternative embodiments of dual-track target wheel in accordance with the invention; and, FIG. 11 generally illustrates as sectional view of an alternative embodiment of a dual-track target wheel wherein one of the tracks is characterized by lack of ferromagnetic material.

DETAILED DESCRIPTION

Figure 1:
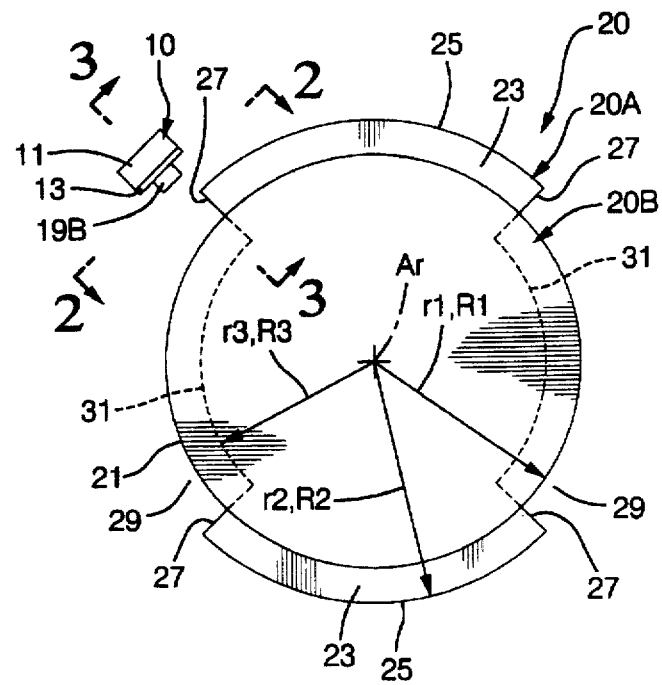
FIG. 1 is a plan view of a rotational sensor including a dual element magnetoresistive sensor and a target wheel taken along a rotational axis of the target wheel in accordance with the present invention.
Figure 2:
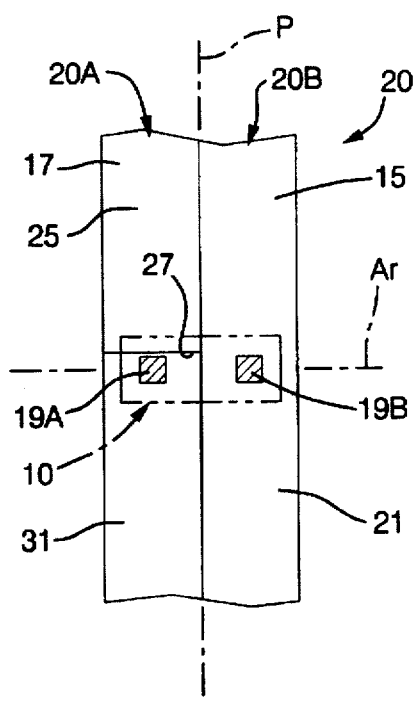
FIG. 2 is a sectional view of the rotational sensor including the target wheel taken along the line 2—2 in FIG. 1.

With reference now to the figures wherein labels common among the various views correspond to similar features, a dual element magnetoresistive (MR) sensor generally designated 10 cooperates with a rotating dual-track, ferromagnetic target wheel generally designated 20. Target wheel 20 comprises two main sections 20A and 20B on opposite sides of a plane 'P' orthogonal to the rotational axis (Ar) of the target wheel. The rotational axis Ar is shown as a point in FIG. 1 representing an axis perpendicular to the plane of the page in that view, and as a line in FIG. 2 parallel the plane of the page in that view. Plane P is parallel to the plane of the page with respect to FIG. 1 and perpendicular to the plane of the page with respect to FIGS. 2–4.

Section 20B of the target wheel is substantially disk-shaped and defines a first track 15 as the target wheel rotates having an outer surface 21 which follows a first radial geometry (R1) relative to the rotational axis Ar and a circumferential cross sectional profile. This profile is the same through all angles of rotation of the target wheel and may therefore be described as substantially angle invariant. Section 20B may be referred to as "single surfaced." Therefore, track 15 of the target wheel provides invariant permeability as it rotates. Section 20A of the target wheel defines a second track 17 as the target wheel rotates having a pair of alternating outer surfaces 25 and 31 which follow radial geometries (R2) and (R3), respectively, and respective circumferential cross sectional profiles. These profiles differ one from the other and alternate through predetermined angles of rotation of the target wheel and may therefore be described as circumferentially alternating. Section 20A, and the general geometry described, may be referred to as "toothed." Therefore, track 17 of the target wheel provides varying permeability as it rotates. The term radial geometry as used herein is to be understood to mean a cross sectional outer surface profile as defined by radii from the rotational axis to the respective surface along the length of the rotational axis delimited by the respective section. Radial geometry as used herein shall be designated with the upper case letter 'R' followed by a differentiating numeral to designate different geometries of a single target wheel. The lower case letter 'r' and numeral are used similarly to designate a single respective radius.

A preferred dual element MR sensor 10 includes biasing magnet 11, a pair of magnetoresistive elements 19A and 19B, and a ferromagnetic shim 13 therebetween. Such a sensor may be found in U.S. Pat. No. 4,926,122 also assigned to the assignee of the present invention. A first MR element 19B is located above the first track 15 and aligned therewith. The dual element MR sensor 10 has a second MR element 19A located above the second track 17 and aligned therewith. Section 20A is essentially disk-shaped having one or more teeth about the circumference. In the exemplary illustration of FIG. 1, two teeth 23 are illustrated. Each tooth 23 has a pair of side surfaces 27 circumferentially between which is a respective outer tooth surface 25 with radial geometry R2. Between side surfaces of adjacent teeth are ferromagnetic discontinuities 29. Outer surface 31 is essentially the root surface between adjacent teeth and may hereafter be referred to as root surface 31. In the case of a section having only a single tooth, the same relationship holds as between side surfaces of the single tooth. Further references in singular with respect to any feature is understood to be applicable to all such similar features when they exist in plurality on a target wheel. While reference is made to sections 20A and 20B, it is understood that in operation the sections rotate synchronously. In fact, such sections are preferably parts of a unitary structure.

Figure 3:
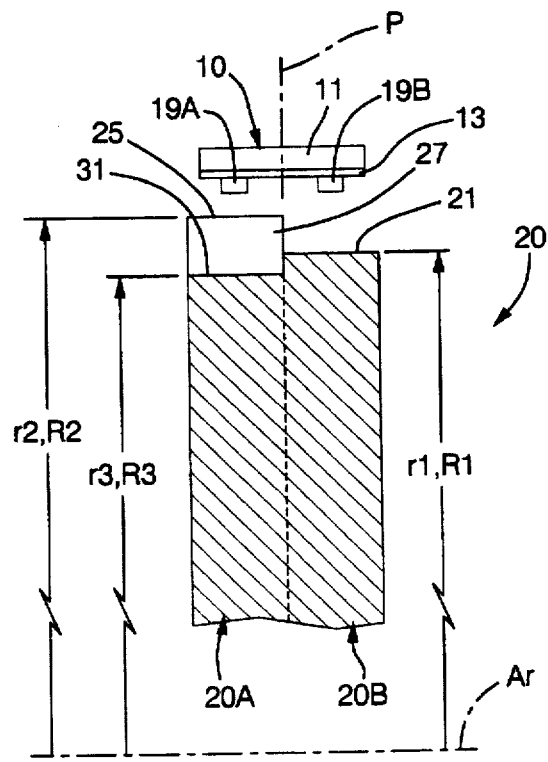
FIG. 3 is a sectional view of a first embodiment of the rotational sensor including the target wheel taken along the line 3—3 in FIG. 1.

In accordance with one preferred embodiment illustrated more specifically with respect to FIG. 3 which is a view taken through section 3—3 of the general illustration of FIG. 1, all so called radial geometries defining the respective outer surfaces of sections 20A and 20B corresponding to points at respective single radii. That is to say, all points defining the outer surface 21 of section 20B are at substantially the same radius (r1) with respect to the rotational axis Ar. Likewise, all points defining the outer surface 25 of each tooth 23 of section 20A are at substantially the same radius (r2), and all points defining the root surface 31 between adjacent teeth 23 of section 20A are at substantially the same radius (r3). The radius r1 is less than the radius r2 but greater than the radius r3, thereby defining the outer surface 21 radially intermediate the outer tooth surface 25 and root surface 31.

This particular embodiment is most readily produced with minimal machining operations by casting the sections as either a single unitary structure using well known powder metal forging (PMF) operations or by casting the sections separately in similar PMF operations and later joining the sections such as during a sintering operation normally practiced on such PMF produced components. Of course, joining the target wheel to the rotating member may require that the castings provide the necessary aperture through the rotational axis of the target wheel or additional machining operations post-sintering providing such provision. Low green strength would generally preclude significant machining operation prior to sintering. In applications wherein the target wheel is indexed to other features of the rotating member, such as for example an engine crankshaft, this method of manufacture is process intensive.

Figure 4:
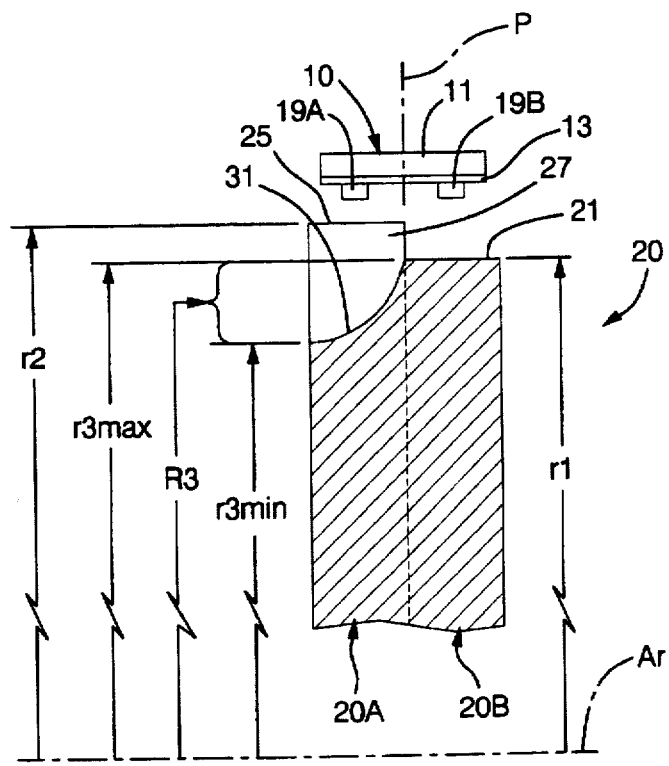
FIG. 4 is a sectional view of a second embodiment of the rotational sensor including the target wheel.

In accordance with another preferred embodiment illustrated more specifically with respect to FIG. 4 which is also a view taken through a similar cross section of a target wheel, all so called radial geometries similarly define the respective outer surfaces of sections 20A and 20B. Similar to the embodiment of FIG. 3, all points defining the outer surface 21 of section 20B are at substantially a single radius r1 with respect to the rotational axis Ar. Likewise, all points defining the outer surface 25 of each tooth 23 of section 20A are at substantially a single radius r2. However, in contrast to the embodiment of FIG. 3, it is here noted that the points defining the root surface 31 between adjacent teeth 23 of section 20A are not at substantially a single radius. Rather, the root surface 31 comprises a sectional profile as illustrated having a maximum radius ($r3_{max}$) at the interface of the section 20A to 20B and a minimum radius ($r3_{min}$) axially opposite thereto. The maximum radius $r3_{max}$ is substantially equivalent to the radius r1 corresponding to the outer surface 21 of section 20B. All radii intermediate ($r3_{int}$) (not labeled in the figure) decrease $r3_{max}$ to $r3_{min}$. The radial geometry R3 of the root surface 31 comprises at least a portion of the radii corresponding to the points defining the root surface 31 being less than the radius r1 of the outer surface of the section 20B. The sectional profile of the root surface 31 as illustrated is essentially that of a semi-circular arc. The radius r1 is less than the radius r2 but greater than the radii defining the radial geometry R3, thereby defining the outer surface 21 radially intermediate the outer tooth surface 25 and root surface 31.

This particular embodiment is most readily produced as integral with the particular rotating member and most advantageously applied to an engine crankshaft or other such indexed application. An engine crankshaft casting preferably is produced in conventional fashion with a dual target wheel blank on a portion thereof coaxial with the rotational axis. This process is a variation of well known crankshaft castings wherein a single track target wheel blank is cast into an appropriate portion thereof. Preferably, in the case of a dual-track target wheel, however, the relevant portions of the casting may take the form of a target wheel blank of substantially double the thickness of a single target wheel blank. A first grinding operation is performed to true the entire blank to the outer diameter of the teeth of toothed section 20A, followed by a second grinding operation performed only on the portion of the blank corresponding to the single surfaced section 20B to true that portion to its final diameter. Alternatively, the crankshaft casting operation may itself substantially provide the two diameters in the target wheel blank corresponding to the respective sections, followed by appropriate operations to true each section. The greater of the two diameters corresponds to the toothed section 20A and the lesser of the two diameters corresponds to the single surfaced section 20B. One or more rotary cutters are brought in from the side of the crankshaft which is indexed appropriately in the machining operation. The cutter or cutters then remove material from the greater diameter section of the target wheel blank to establish the discontinuities. The rotary cutters therefore result in a root surface 31 characterized by a substantially semi-circular arc as shown in the embodiment of FIG. 4. The precise shape of the root surface will of course depend upon the size of the rotary cutter and depth of plunge radially into the target wheel blank. Such a manufacturing process is therefore seen to provide significant throughput advantages.

The embodiments are illustrated with both sections having substantially equivalent axial thickness, the equivalency being merely a choice of convenience and not one of necessity. For example, a target wheel having a total thickness of 12 mm has performed satisfactorily with an 8 mm toothed section and a 4 mm constant section. In many of the various manufacturing processes available for producing such a target wheel, a main consideration for the thickness of the individual sections is the ability of each section to withstand the forces of machining processes without damage. This may be especially true where cutting tools are applied at fast rates. In application to engine crankshaft sensing, location of the target wheel on the crankshaft is limited to certain areas as is placement of the MR sensor limited with respect to the engine block. Therefore, non-equivalency in the thicknesses of the two sections may be required to ensure adequate structural strength and alignment of the two sections with respective sensor elements.

With reference to the processing circuit 50 of FIG. 4, an operational description of the target wheel is introduced. The individual MR elements 19A and 19B are modeled as viable resistors. It is well known that the resistance value of a MR element varies in accordance with the magnetic flux passing therethrough. One end of each MR is coupled to a circuit ground. The other end of one of the MR elements, 19A in the illustration, is coupled via line 55 to the non-inverting input of a high gain, low hysteresis, operational amplifier or comparator 56. Similarly, the other end of the other of the MR elements, 19B in the illustration, is coupled via line 57 to the inverting input of the comparator 56. For purposes of the present illustration, it is assumed that the output of the comparator 56 is the variety coupled to the collector of an output stage transistor. Current sources 51 and 53 provide constant currents to the MR elements 19A and 19B, respectively. A voltage is thereby impressed across each MR element and provided as a respective input to the comparator 56. Whenever the comparator 56 sees a voltage at the non-inverting input in excess of the voltage seen at the inverting input, an open collector is established thereby resulting in a high level voltage L2 at the output terminal Vout. Whenever the comparator 56 sees a voltage at the inverting input in excess of the voltage seen at the non-inverting input, a grounded collector is established thereby resulting in a low level voltage L1 at the output terminal Vout.

Figure 5:
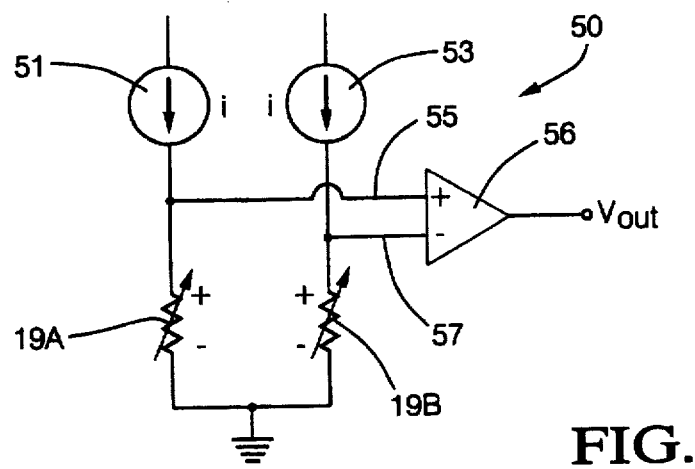
FIG. 5 is a schematic illustration of a circuit for processing complementary signals from the dual element MR sensor.

A single track target wheel, such as conceptualized as toothed section 20B only, when rotating in proximity to an MR element causes the flux density to alternate between high and low values corresponding to MR element alignment with teeth and discontinuities, respectively. Consequently, the MR element is established at high and low resistance values. For a dual-track target wheel which has been described as a 'mirror-image' arrangement wherein teeth on each section are generally axially adjacent to discontinuities on the other section, rotation in proximity to a dual element MR sensor arranged as described produces substantially angle coincident inverse resistive changes to the individual MR elements. These resistive changes may be translated into respective voltage signals by a circuit substantially as shown in and described with respect to FIG. 5, the output of which may provide highly accurate position information corresponding to the transitions between output voltage levels. Such complementary arrangements provide substantial improvements over single element MR arrangements with respect to inevitable deleterious effects of variations in temperature, air gaps and degradation of the biasing magnet strength.

Figure 6A:
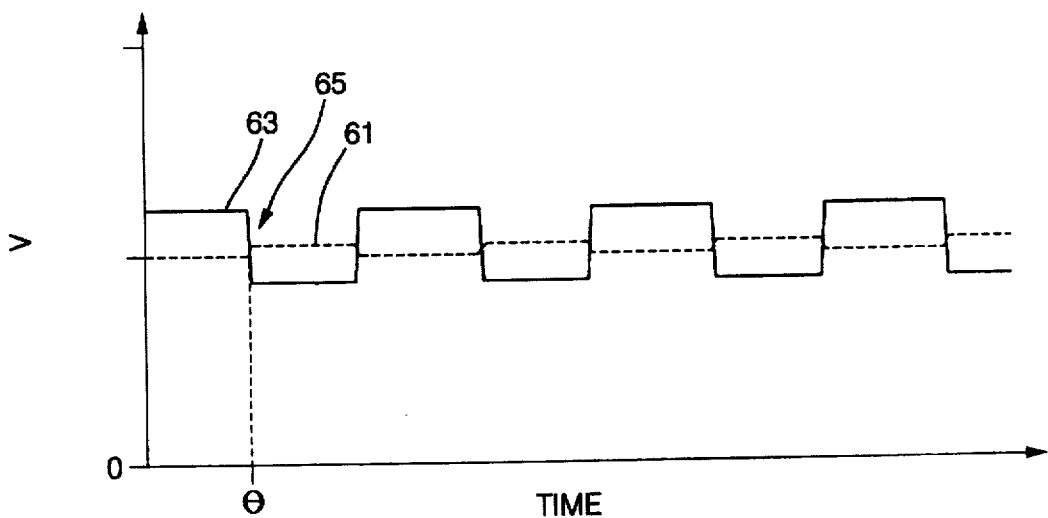
FIGS. 6A and 6B illustrate voltage waveforms of the individual MR elements of the dual element MR sensor and an output voltage signal generated therefrom by the processing circuit of FIG. 5.
Figure 6B:
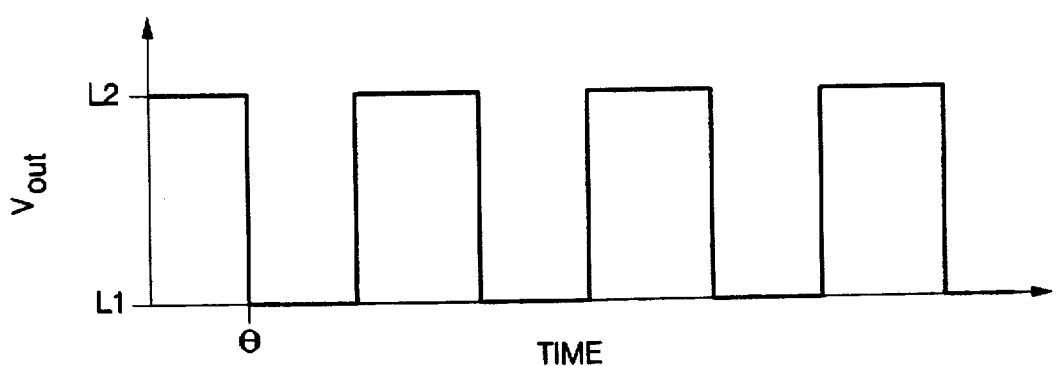

A dual-track target wheel in accordance with the present invention rotating in proximity to a dual element MR sensor likewise produces substantially angle coincident inverse resistive changes to the individual MR elements, however without use of a 'mirror-image' dual target wheel arrangement. With reference to FIGS. 6A and 6B, the operation of a dual-track target wheel in accordance with the present invention is further described. FIG. 6A illustrates relative analog voltage signals impressed across the MR elements and provided to the inputs of comparator 56 of FIG. 5. Trace 63 corresponds to the voltage across MR element designated 19A in the various figures, which element corresponds to toothed section 20A. The relatively high voltage level corresponds to a tooth proximate the MR element 19A and consequent flux density increase, while the relatively low voltage level corresponds to a discontinuity proximate the MR element 19A and consequent flux density decrease. The transition between the two relative voltage levels corresponds to the transition from one of the teeth or discontinuities to the other. Trace 61 corresponds to the voltage across MR element designated 19B in the various figures, which element corresponds to single surfaced section 20B. Section 20B establishes no direct flux density variations as the target wheel is rotated. The main influence of single surfaced section 20B is with respect to an offset level of resistance in the MR element 19B and consequent voltage offset. However, trace 61 conspicuously exhibits an analog voltage signal indicative of variations in the resistance of the MR element 19B corresponding to the single surfaced section 20B. In fact, the signal exhibited is a substantially angle coincident inverse, though of lesser peak-to-peak magnitude, of the analog voltage signal 63. With respect to the analog voltage signal across MR element 19B as represented by trace 61, the relatively low voltage level corresponds to a tooth proximate the other MR element 19A, while the relatively high voltage level corresponds to a discontinuity proximate the other MR element 19A. The section 20A provides an indirect flux density influence upon the MR element 19B. Passage of a tooth beneath the MR sensor 10 influences the flux density such that the flux density through the MR element 19B is reduced in the presence of a nearby tooth. Similarly, the flux density through the MR element 19B is increased in the presence of a nearby discontinuity. Therefore, as concerns either analog voltage signal 63 or 61, the respective transitions between the two relative voltage levels corresponds to the transition from one of the teeth or discontinuities to the other.

With additional reference now to FIG. 6B, the output of the circuit 50 is illustrated. The output voltage Vout is shown to vary between a high level L2 and a low level L1. The transition from one level to another occurs upon the crossing of the analog voltage signals shown in FIG. 6A. One such exemplary point of transition is labeled 65 in that figure at an angular position θ, it being understood that all other similar crossings will result in similar transitions in the output voltage Vout of the circuit 50. Therefore, the sensor as disclosed herein is effective to produce the high accuracy rotational and positional information characteristic of dual-track target wheel sensing apparatus.

Up to this point in the description of the two exemplary preferred embodiments of FIGS. 3 and 4, utilization of substantially matched MR elements and substantially matched current sources is assumed. Therefore, the positions of the analog voltage signals 63 and 61 relative to one another as shown in FIG. 6A is due predominantly to the ferromagnetic influence established by the geometry of the dual-track target wheel. As described earlier, the main influence of the single surfaced section 20B is with respect to an offset level of resistance in the MR element aligned therewith and consequent voltage. With the desirable objective of having the rising and falling edges of the complementary voltage signals 61 and 63 intersect one another at mid-points between respective high and low values, the general relationships hereinbefore described with respect to the various surface profile radial geometries have proved to be preferred. That is to say, such arrangements having substantially equivalent MR elements and current sources, and radial geometries which cooperate to establish the coincidence of mid-point voltages have proven most tolerant to temperature and air gap variations. Stated functionally, for a given toothed section, the radial geometry of the adjacent single surfaced section may be used to establish the desirable coincidence of the midpoint voltages across the individual matched MR elements. The surface profile radial geometry does not lend itself to limitations adequately described only with respect to physical geometries; rather, the limitations thereof are most completely and accurately described by way of the ferromagnetic influence such section has upon the MR sensor. For example, the embodiment of FIG. 1 shows a preferred relationship between the various surfaces wherein each surface profile comprises points at a single respective radius, and the relationship readily reduces itself to the relatively simple expression $r2>r1>r3$. With respect to the embodiment of FIG. 4, the complexity of the root surface 31 having a radial geometry R3 wherein the surface profile comprises points at a multiplicity of radii including radii designated $r3_{min}$, $r3_{max}$ and a multiplicity of intermediate radii $r3_{int}$, the relationship reduces itself to a more complex expression $r2>r1 \geq r3_{max}>r3_{int} \geq r3_{min}$. It is fully envisioned that one having ordinary skill in the art would readily recognize alternative geometries which would provide for the ferromagnetic effects resulting in the desired complementary voltage signals 61 and 63 intersecting one another at mid-points between respective high and low values.

Certain alternative geometries may require unmatched MR elements and or matched current sources calibrated to establish the desired positions of the analog voltage signals 63 and 61 relative to one another as shown in FIG. 6A (i.e. rising and falling edges of the complementary voltage signals 61 and 63 intersecting one another at mid-points between respective high and low values). These geometries may provide certain manufacturing advantages thus making them more attractive in certain applications. However, optimization of the intersection by these techniques may prove less tolerant to temperature and air gap variations. Some non-exhaustive exemplary geometries are illustrated in similar cross section in FIGS. 7-10. The illustrations are similar in layout to those of FIGS. 3 and 4; however, the MR sensor and a majority of the labeling has been removed with the exception of the various surface profile designations 21, 25, and 31 corresponding to the toothed and constant sections 20A and 20B, respectively. In each of these embodiments, toothed section 20B provides a track of alternating permeability and the other section 20A provides a second track of invariant permeability. Therefore, the present embodiments have a first track of alternating permeability and a second track of invariant permeability.

The embodiments illustrated in FIGS. 7 and 8 when applied in concert with an MR sensor having substantially equivalent elements and current sources would result in an offset of the analog voltage 61 upward with respect to the analog voltage 63. Similarly, the embodiments illustrated in FIGS. 9 and 10 when applied in concert with an MR sensor having substantially equivalent elements and current sources would result in a offset of the analog voltage 61 downward with respect to the analog voltage 63. Adjusting characteristics, in particular size of the MR element and/or balance of the current sources, could then be implemented to achieve the desired coincidence of the respective rising and falling edges at respective mid-point voltages.

Furthermore, the embodiments described and illustrated envision substantially solid ferromagnetic structures. However, the ferromagnetic target wheels may comprise non-magnetic hub members with one or more substantially annular ferromagnetic outer members secured thereto for providing the necessary toothed and single surfaced sections. Therefore, it is to be understood that any cross section referred to with respect to the respective sections shall mean cross section of relevant ferromagnetic portions having substantial influence upon the sensor operation.

Yet another embodiment is illustrated in FIG. 11 taking advantage of the already established fact that the main influence of a single surfaced section adjacent a toothed section is with respect to establishing an offset level of resistance in the MR element aligned therewith. A dual-track target wheel has a toothed section 20B providing a track of alternating permeability and a lack of ferromagnetic material axially adjacent thereto providing a track of invariant permeability. The MR sensor 10 has MR element 19A aligned with the section 20A and a MR element 19B axially offset therefrom as in the previously described embodiments. Obviously, however, in the present embodiment no ferromagnetic material is directly radially adjacent the MR element 19B to thereby provide the ferromagnetic influence upon the MR element 19B. Rather, the proximity of the section 20A, and primarily the portions thereof radially inboard of the root surfaces of the teeth, provide a degree of ferromagnetic influence upon the MR element 19B. In operation, this embodiment operates similar to the embodiments of FIGS. 7-10 wherein the characteristics of the MR elements and/or current sources are adjusted away from substantial equivalency to achieve the desired coincidence of the respective rising and falling edges of the analog voltage signals at respective mid-point voltages. Therefore, the present embodiment has a first track of alternating permeability and a second track of invariant permeability.

While the invention has been described with respect to certain exemplary, preferred embodiments, it is understood that certain alterations thereto will be apparent to those having ordinary skill in the art and are intended to be encompassed by the scope of the invention as set forth in the appended claims.

We claim:

1. A target wheel for a rotation sensor comprising:
   a rotational axis;
   a first track characterized by alternating high and low permeability as the target wheel rotates;

a second track axially adjacent said first track characterized by invariant permeability as the target wheel rotates; and a dual element magnetoresistive sensor having a bias magnet and axially aligned first and second magnetoresistive elements, said first magnetoresistive element radially aligned with said first track and said second magnetoresistive element radially aligned with said second track, each one of said first and second magnetoresistive elements having respective resistance values which vary in accordance with the magnetic flux density therethrough.

2. A ferromagnetic target wheel for a rotation sensor comprising:

a rotational axis;

a first section having a substantially angle invariant first cross sectional profile;

a second section axially adjacent said first section having circumferentially alternating second and third sectional profiles; and a dual element magnetoresistive sensor having a bias magnet and axially aligned first and second magnetoresistive elements, said first magnetoresistive element radially aligned with said first track and said second magnetoresistive element radially aligned with said second track, each one of said first and second magnetoresistive elements having respective resistance values which vary in accordance with the magnetic flux density therethrough.

3. A ferromagnetic target wheel as claimed in claim 2 wherein each of said cross sectional profiles includes a respective cross sectional outer surface, said respective cross sectional outer surface associated with said first cross sectional profile being substantially radially intermediate said respective cross sectional outer surfaces associated with said second and third cross sectional profiles.

4. A dual-track, ferromagnetic target wheel as claimed in claim 3 wherein said respective cross sectional outer surface profiles associated with said first and second cross sectional profiles are substantially parallel to said rotational axis at respective first and second radii from said rotational axis, said first radius being substantially between 1.0 mm and 2.0 mm less than said second radius.

5. A rotation sensor comprising:

a rotational axis;

a target wheel including first and second tracks;

a dual element magnetoresistive sensor having a bias magnet and axially aligned first and second magnetoresistive elements, said first magnetoresistive element radially aligned with said first track and said second magnetoresistive element radially aligned with said second track, each one of said first and second magnetoresistive elements having respective resistance values which vary in accordance with the magnetic flux density therethrough;

said first track characterized by alternating high and low permeability as the target wheel rotates and said second track characterized by invariant permeability as the target wheel rotates; and, means for producing an output signal which is a function of the difference between the respective resistance values.

6. A rotation sensor as claimed in claim 5 wherein said means for producing an output signal comprises current means for sourcing currents through the first and second magnetoresistive elements to thereby produce respective voltages thereacross, and comparator means for producing an output signal in response to said respective voltages, said output signal having a first level when the respective voltage across the first magnetoresistive element exceeds the respective voltage across the second magnetoresistive element, and having a second level when the respective voltage across the second magnetoresistive element exceeds the respective voltage across the first magnetoresistive element.

7. A dual-track target wheel for a rotation sensor, comprising:

a rotational axis;

a plane orthogonally intersecting said axis;

a ferromagnetic first structure on one side of said plane, said first structure being substantially disk-shaped having a circumferential outer surface at substantially a first radius relative to said rotational axis; and, a ferromagnetic second structure axially adjacent said first structure on the other side of said plane, said second structure having a plurality of circumferentially spaced ferromagnetic teeth, each tooth comprising an outer tooth surface at substantially a second radius greater than said first radius and a pair of circumferentially spaced side surfaces, adjacent ones of said circumferentially spaced ferromagnetic teeth circumferentially delimiting respective ferromagnetic discontinuities therebetween, each respective ferromagnetic discontinuity further being delimited by a substantially symmetrical root surface comprising points having respective radii no greater than said first radius, said root surface further comprising at least a portion of said points having respective radii less than said first radius.

* * * * *